United States Patent
Baranowski et al.

(10) Patent No.: US 9,575,703 B2
(45) Date of Patent: Feb. 21, 2017

(54) PORTABLE ELECTRONIC PRINTING DEVICE

(71) Applicants: Miroslaw Baranowski, Warsaw (PL); Michal Pawlowski, Legionowo (PL)

(72) Inventors: Miroslaw Baranowski, Warsaw (PL); Michal Pawlowski, Legionowo (PL)

(*) Notice: Subject to any disclaimer, the term of this patent is extended or adjusted under 35 U.S.C. 154(b) by 0 days.

(21) Appl. No.: 15/101,846

(22) PCT Filed: Dec. 5, 2014

(86) PCT No.: PCT/EP2014/076763
§ 371 (c)(1),
(2) Date: Jun. 3, 2016

(87) PCT Pub. No.: WO2015/082703
PCT Pub. Date: Jun. 11, 2015

(65) Prior Publication Data
US 2016/0335037 A1    Nov. 17, 2016

(30) Foreign Application Priority Data

Dec. 5, 2013 (PL) .......................... 406394

(51) Int. Cl.
*B41J 29/00* (2006.01)
*G06F 3/12* (2006.01)
(Continued)

(52) U.S. Cl.
CPC .............. *G06F 3/1292* (2013.01); *B41J 2/315* (2013.01); *G06F 3/1243* (2013.01);
(Continued)

(58) Field of Classification Search
CPC ......... B41J 29/00; B41J 29/023; B41J 29/026; B41J 29/02; B41J 2/315; G06F 3/1292; G06F 3/1243; G06F 3/1279; G06K 15/028;G06K 15/005; G07G 1/0018; H04N 1/00334
See application file for complete search history.

(56) References Cited

U.S. PATENT DOCUMENTS 6,181,361 B1 * 1/2001 Bluteau ...................... B41J 2/32
347/222
6,373,511 B1   4/2002 Groves et al.
(Continued)

FOREIGN PATENT DOCUMENTS

CN      202018699 U    10/2011
CN      202257782 U    5/2012
(Continued)

OTHER PUBLICATIONS

ISA/EP, International Search Report issued on Jun. 6, 2015 in International Application No. PCT/EP2014/076763, total 3 pages.

*Primary Examiner* — Kristal Feggins
(74) *Attorney, Agent, or Firm* — Masuvalley & Partners

(57) ABSTRACT

The invention is related to a portable electronic printing device equipped with a microprocessor, comprising a data processing module and a touch display designed for the user to communicate with the device and a printer module electronically connected and integrated in a single housing with the touch display equipped with a paper tray and an opening for paper output from the printer, characterised in that the opening designed for paper output from the printer (5) extends in parallel to the edge of the touch display (3) and is a located at a distance of not more than 80 mm from this edge, more preferably not more than 5 mm from this edge, and most preferably it is adjacent to this edge, wherein the housing of the said device has a back plane located opposite the touch display (3), the said plane being parallel to the surface of the touch display (3) at least in the part comprising the housing of the data processing module (2).

(Continued)

The invention also relates to a use of the portable electronic printing device as part of the sales system.

16 Claims, 2 Drawing Sheets

(51) Int. Cl.
- *B41J 2/315* (2006.01)
- *G06K 15/02* (2006.01)
- *G06K 15/00* (2006.01)
- *H04N 1/00* (2006.01)
- *G07G 1/00* (2006.01)

(52) U.S. Cl.
CPC ......... *G06F 3/1279* (2013.01); *G06K 15/005* (2013.01); *G06K 15/028* (2013.01); *G07G 1/0018* (2013.01); *H04N 1/00334* (2013.01)

(56) References Cited

U.S. PATENT DOCUMENTS

| | | | |
|---|---|---|---|
| 2003/0184643 A1* | 10/2003 | Fujiwara | B41J 29/00 347/222 |
| 2004/0027444 A1 | 2/2004 | Silverbrook et al. | |
| 2007/0133014 A1 | 6/2007 | Lee | |
| 2009/0248579 A1 | 10/2009 | Kaminski et al. | |
| 2011/0063399 A1* | 3/2011 | Tsuchiya | B41J 2/32 347/222 |
| 2014/0085395 A1* | 3/2014 | Takahashi | B41J 29/02 347/222 |

FOREIGN PATENT DOCUMENTS

| | | |
|---|---|---|
| CN | 202275464 U | 6/2012 |
| CN | 202584304 U | 12/2012 |
| CN | 202816050 U | 3/2013 |
| CN | 202878906 U | 4/2013 |
| CN | 202929766 U | 5/2013 |

* cited by examiner

PORTABLE ELECTRONIC PRINTING DEVICE

RELATED APPLICATIONS

The application is the U.S. National Phase of International Application No. PCT/EP2014/076763, filed Dec. 5, 2014, entitled "PORTABLE ELECTRONIC PRINTING DEVICE," and claims priority to Polish Patent Application No. 406394, filed Dec. 5, 2013, which are hereby expressly incorporated by reference in their entirety for all purposes.

The Invention is related to a portable electronic printing device. The device can be used in many areas, ranging from widespread private use and ending with retail sales, including gastronomy and hotel industry, and specialised use related to the obligation to print receipts of transactions made, for example, sales of transport tickets or parking tickets.

Electronic devices that have the ability to print are known in the art. As elements of sale system, they are constructed based on cash desks, which are specialised computers of PC (personal computer) class, constituting a central unit, connected with electric wires to other peripheral devices (LCD monitor, optionally equipped with a touch display, barcode reader, cash register keyboard, payment terminal and others), including receipt printer. In such solutions, computerised system integration is usually based on cable network. Conceptually, this solution is stuck in the early 90s of the last century, and is often outdated in technological terms. At the same time, it is obvious that this configuration is not suitable for portable applications due to the post complexity and multitude of equipment.

In the last few years, however, a very rapid development of mobile devices, mainly tablets and smartphones, has been observed. Development of new technologies is driven by the needs of the consumer electronics market, in particular by:

- desire to maximise the ergonomics of use—hence the commonly used touch displays, also in smartphones,
- need to transfer, process and store multimedia files, including video files of increasingly better qualities, which results in increasingly better LCD/OLED displays and in increasing higher computational power,
- desire to provide the customer with increasing better and easier access to resources and services contained in the virtual space (Internet, social networking sites, network services, shops, etc.), The following experiences and solutions are particularly noteworthy:

- perfectly designed graphical user interfaces based on LCD/OLED touch display, allowing easy handling of the device both at the system and application levels; interfaces of various devices are quite similar, and significant majority of the population of users is already accustomed to these standards,
- processors and systems for supporting graphics (sometimes in a single chip) having high computational power and being very energy efficient,
- operating systems integrated with a standardised graphical user interface, using the touch display function, built specifically for mobile devices, which implies the effective use of computational power (e.g. smooth switching between tasks), as well as significant development of network access techniques or of "virtual space" (present in "old, classic" systems typical of large machines, and quite neglected in machines of PC type).

These possibilities are gradually being perceived and implemented by the market, thus allowing implementation of selected functionalities of sale system. For example, applications for typical mobile devices, which communicate with the printer (e.g. fiscal printer) via Bluetooth interface, or applications that allow, in some form, implementation of transactions by means of payment cards, are created. The drawback of such solutions is usually quite random (not rarely) hardware and software configuration of such a solution (e.g. insecure operating system and/or unreliable interface of peripheral device).

On the market, more modern devices are also available, which have computational capabilities assigned to standard computers, most of them being equipped with a touch display, which contain in a single housing, in addition to the processing system (central unit), also other functional modules, e.g. printing module, which are characterised by significant dimensions.

A solution from publication CN202584304 (U) can serve as an example, which is constituted by a typically stationary device of large dimensions. It fulfils the function of a fiscal printer. The device is equipped, in addition to a data processing module and a cashbox, with a printing terminal (for printing receipts) and two displays: a touch display for the cash register operator, and a smaller one, arranged at the back of the device, for the buyer. Other similar machines are presented in publications CN202878906 (U) and CN202257782 (U). The first of them is a stationary printing machine, having a large display arranged on its base, and a printing module. The second one is a computer printing device, equipped with a large slidable display.

In turn, from publication CN202929766 (U), an invoicing machine is known, an integral part of which is a printer and a computer with a touch display—both parts are combined in a single housing and are adjacent to each other, wherein the opening for paper output from the printer is located at half the height of the display.

A device according to the utility model from publication CN202275464 (U) is a similar one which combines printing and computing functions. It is a large-sized device which contains a computer module together with a printing module. The opening for paper output from the printer terminal is arranged under the touch display. An analogous solution can be found in publication CN202816050 (U).

All above-described latest generation devices, having a printing function, contain a touch display. If they are equipped with a printer terminal, built into the housing, they still, as a whole, have considerable dimensions. This hinders the ability to use them as portable printing devices. An example of device having smaller dimensions (and therefore weight), designed for carrying is a sales terminal from publication CN202018699 (U), which, being a device similar in appearance to the first mobile phone prototypes, contains, as parts being integral with one common housing: a printing module, a small display and a keyboard for communication with the device. The above device, which results from its destination as a payment terminal, does not have the majority of modern functionalities attributed to tablets or smartphones, such as e.g. a touch display.

The above examples of devices known on the market confirm that on the market, so far, there is not any technical solution for consumer electronics, which would have modern functionalities available on the market (e.g. openness of software platform to modification of application software, or wide possibilities of communication with virtual space by means of various protocols and hardware interfaces), resulting from technological solutions to ensure ergonomics, reliability, compactness and low power consumption, which are typical of smartphone or tablet devices, which would have, at the same time, a printing function.

Also, there is not any solution which would improve sales service, while meeting the demands of fiscalisation in a number of service areas, which is related to the obligation to print receipts for transactions made.

Therefore, it is an object of the invention to develop such a solution which would be a portable, compact and wireless device which could be used as a handheld device, without size restrictions, and which would combine above-described modern technologies, including the touch display, and have the ability to print. At the same time, the device would be devoid of all the above-mentioned disadvantages found in existing devices.

This device would be fully adapted to carry out the sales of goods and services, and the implementation of additional services and functionalities related to the integration with a local area network and virtual space.

A portable electronic printing device equipped with a microprocessor, comprising a data processing module and a touch display designed for the user to communicate with the device and a printer module electronically connected and integrated in a single housing with the touch display, equipped with a paper tray and an opening for paper output from the printer, according to the invention is characterised in that the opening designed for paper output from the printer extends in parallel to the edge of the touch display and is a located at a distance of not more than 80 mm from this edge, more preferably not more than 5 mm from this edge, and most preferably it is adjacent to this edge, wherein the housing of the said device has a back plane located opposite the touch display, the said plane being parallel to the surface of the touch display at least in the part comprising the housing of the data processing module.

Preferably, the printer module is equipped with a thermal printing mechanism.

Preferably, the printer module is equipped with a paper tray, preferably with a paper tray on a roll.

Preferably, the connection between the housing of the data processing module and the printer module is releasable, and the printer module is equipped with its own controller.

Preferably, the printer module is permanently integrated with the housing of the data processing module.

In this case, preferably, the printer module is equipped with its own controller which is connected to the data processing module via an interface, preferably including USB or RS232 connector.

In case the printer module is permanently integrated with the housing of the data processing module or is equipped with its own controller connected to the data processing module via an interface, especially including USB or RS232 connector, then, preferably the printer module is controlled by a microprocessor of the device.

Preferably, the device according to the invention is equipped with an additional display, more preferably arranged on a side wall of the printer module.

Preferably, the data processing module is equipped with RAM memory and FLASH memory.

In this case, preferably, the FLASH memory is implemented based on at least one of the following elements: blocks mounted on the motherboard of the data processing system module, SD cards, SSDs.

Preferably, the data processing module includes a graphics support system.

In this case, preferably the microprocessor and the graphics support system constitute an integrated circuit in the form of a single SoC block.

Preferably, the device according to the invention is equipped with at least one element allowing reading of bar codes, especially with a camera or a scanner.

Preferably, the device according to the invention is equipped with an RFID proximity reader.

Preferably, the data processing module is equipped with at least one network interface.

In this case, preferably, the network interface is selected from the group consisting of: Ethernet cable connection, WLAN module, Bluetooth module, mobile network interface, most preferably 3G/LTE.

Preferably, the data processing module has a multitasking operating system running in real time.

In this case, the operating system is equipped with a graphical user interface.

Preferably, the standard of easy paper loading system is used in the printer module.

Preferably, the device according to the invention is equipped with an internal power source of battery or storage battery type.

Preferably, the data processing module is a tablet or a smartphone.

Preferably, the data processing module has a touch display with a diagonal of 9 to 18 cm, more preferably of 10 to 15 cm.

The object of the present invention is also a use of this portable electronic printing device as part of the sales system.

PREFERRED EMBODIMENT OF THE INVENTION

Now, the invention will be presented in greater detail in a preferred embodiment, with reference to the accompanying drawings in which.

Figure 1:
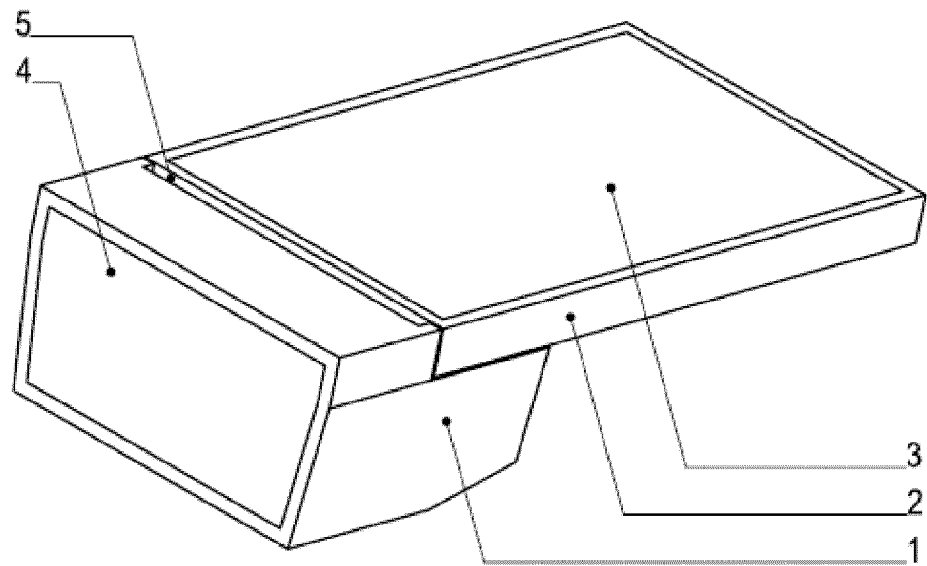
FIG. 1 shows a pictorial side view of the invention described below in Example 1.

In the drawings, the following designations were used: 1—printer module, 2—data processing module, 3—touch display, 4—additional display, 5—opening for paper output from the printer, 6—connectors.

Figure 2:
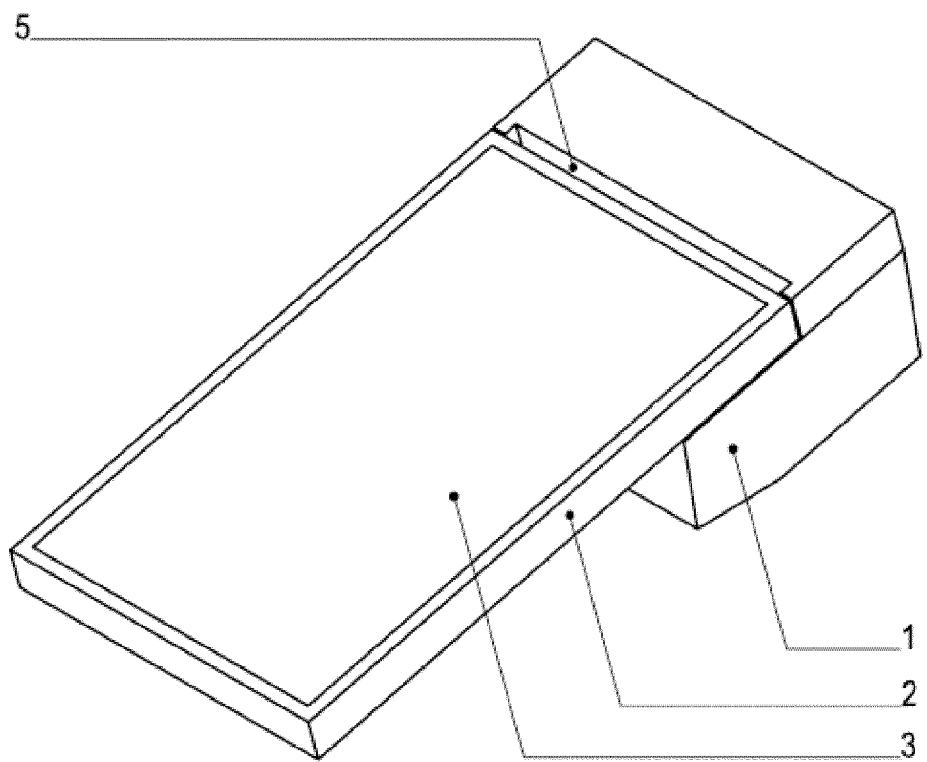
FIG. 2 shows a pictorial top view of the invention described below in Example 1.
Figure 3:
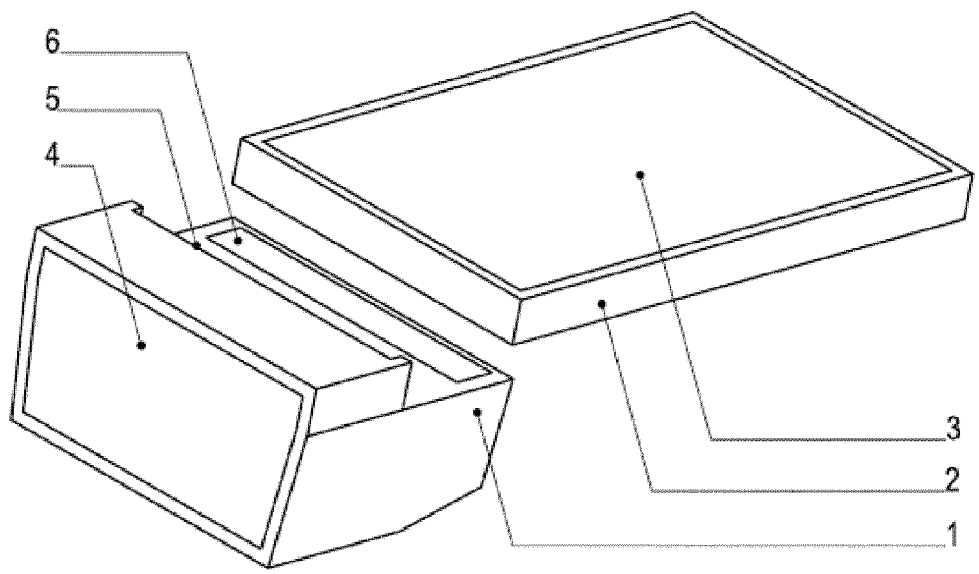
FIG. 3 shows a side view of a data processing module and a printer module, separately, constituting the device according to the invention, the view showing the point of connection of modules, provided with connectors, and the view being described in Example 1.
Figure 4:
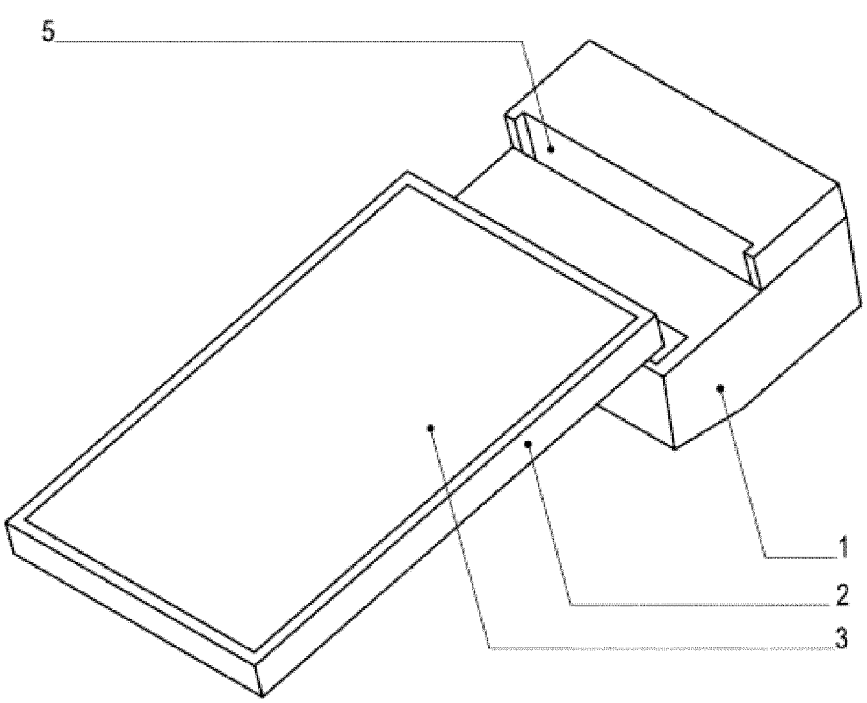
FIG. 4 shows a pictorial top view of the data processing module and the printer module, separately, constituting the device according to the invention, the view showing the point of connection of modules, provided with connectors, and the view being described in Example 1.

In a preferred embodiment, a portable electronic printing device according to the invention, shown in FIG. 1 and FIG. 2, in a pictorial side view, contains a data processing module 2, a touch display 3, designed for the user to communicate with the device, including application support, and a printer module 1, equipped with a thermal mechanism (so-called thermal printer). The housing of the device has a back plane arranged opposite the touch display 3 and it is parallel to the surface of the touch display (3). The data processing module 2 is constituted by a tablet. The device is equipped with a high-performance and energy-efficient microprocessor. The printer module 1 is electronically connected and integrated in a single housing with the touch display 3. The back plane of the housing is arranged opposite the touch display 3 and is parallel to its surface. The technology, size and resolution of the touch display 3 depend on the needs and definition of the product—its diagonal is 13 cm. Alternatively, the touch display 3 has a diagonal of 9 to 18 cm, and more preferably of 10 to 15 cm. The connection between the housing of the data processing module 2 and the printer module 1 is releasable, so that the printer module 1 constitutes a detachable assembly and is equipped with its own controller. The point of connection of both modules is shown in FIG. 3 and in FIG. 4, with an indication of a connector 6. Alternatively, the printer module 1 is permanently integrated with the housing of the data processing module 2 and, most preferably, it is equipped with its own controlling controller which performs a specific set of control commands. The printer module 1 is connected to the data processing system 2 via a USB or RS232 interface, or, in cheaper solutions, can be controlled by a microprocessor of the processing module of the device according to the invention.

In a special case when the device is intended for markets with the obligation to fiscalise sales systems, the printer module 1 constitutes a cash register within the meaning of local regulations (so-called fiscal printer or transaction recorder). Then, the device according to the invention is optionally equipped with an additional display 3 for the client, more preferably arranged on a side wall of the printer module 1. This, and not different, location of the additional display allows easy viewing (by the user) of operations performed on the device, including displaying of the desired amount of duty in the case of using the device according to the invention as part of the sales system. The printer module 1 is equipped, within the housing, with a paper tray on a thermal roll, having width and length (of diameter) adapted to the type of product. The so-called easy loading system should be a standard. An ergonomic localisation of document output, in the form of an opening intended for paper output from the printer 5, is also important, the opening being adjacent to the edge of the touch display 3 and extending along this edge. Localisation in FIG. 1-4 directly above the additional display 4 of the customer is only exemplary.

The data processing module 2 optionally includes a graphics support system. The heart of the device is an integrated circuit combining the above two functions of the microprocessor and of the graphics support system in a single block, referred to as SoC (System-on-a-Chip—an integrated circuit comprising a complete electronic system). The above integrated circuit integrates general data processing functions of CPU (Central Processing Unit) with functions of specialised graphics data processing of GPU (Graphic Processing Unit) and has a set of various general purpose interfaces (SPI, I2C, Ethernet and others).

The data processing module 2 also contains sufficient resources of RAM (Random Access Memory, where currently running programs and data for these programs, and results of their operations are stored) and sufficient resources of FLASH (memory allowing saving and deleting of a number of memory cells during a single programming operation). The FLASH memory is implemented based on at least one of the elements: blocks mounted on the motherboard of the data processing module 2, SD (Secure Digital) memory cards, SSDs (solid-state disks)—depending on specific definition of product and operating system requirements.

Also, a set of network interfaces is selected according to the needs. WLAN module (in various embodiments, e.g., 2.5 GHz or 2.5/5 GHz) and Bluetooth module are standards. Optionally, 2G/3G/4G (LTE) cellular network interface and Ethernet cable connection can also be used. Due to the need to read bar codes—linear or two-dimensional 2D (QR), the device is equipped with at least one element selected from: a camera or a scanner. Optionally, the device can be equipped with a proximity reader (RFID-Radio-frequency identification).

The data processing module 2 has a multitasking operating system which runs in real time (RTOS—Real Time Operating System). The use of a standard system adapted for mobile devices, especially having a typical graphical user interface (GUI), is the most effective. In special cases, creation of a specialised system, or even integration of applications with functions of the operating system (embedded RTOS) is also possible. The device is equipped with an internal power source of battery or storage battery type.

The device can be used as part of the sales system, which, as a portable, handheld and wireless device, is equipped with the above-described modern functionalities, and has, at the same time, a printing function, including printing of receipts for transactions made.

The invention claimed is:

1. A portable electronic printing device equipped with a microprocessor, said device comprising a data processing module and a touch display designed for a user to communicate with the device, and a printer module electronically connected and integrated in a single housing with the touch display and is equipped with a paper tray having an opening for paper output from the printer, wherein the housing of the device has a back plane located opposite side of the touch display, said plane being parallel to a surface of the touch display at least in a part which comprises the housing of the data processing module, wherein the printer module is permanently integrated with the housing of the data processing module, and the opening designed for paper output from the printer extends in parallel to an edge of the touch display and is located at a distance being not more than 80 mm from this edge.

2. The device according to claim 1, wherein the printer module is equipped with a thermal printing mechanism.

3. The device according to claim 1, wherein the printer module is equipped with a paper tray on a roll.

4. The device according to claim 1, wherein the printer module is equipped with its own controller which is connected to the data processing module via an interface.

5. The device according to claim 4, wherein the interface comprises a USB or an RS232 connector.

6. The device according to claim 1, wherein the printer module is controlled by the microprocessor of the device.

7. The device according to claim 1 further comprises an additional display arranged on a side wall of the printer module.

8. The device according to claim 1, wherein the data processing module comprises a RAM memory and a FLASH memory, said FLASH memory is implemented based on at least one of the following elements: blocks mounted on the motherboard of the data processing system module, SD cards, SSDs.

9. The device according to claim 8, wherein the data processing module further comprising a graphics support system.

10. The device according to claim 9, wherein the microprocessor and the graphics support system constitute an integrated circuit in the form of a single SoC block.

11. The device according to claim 8, wherein the data processing module further comprising at least one network interface selected from the group consisting of Ethernet cable connection, WLAN module, Bluetooth module, and 3G/LTE mobile network interface.

12. The device according to claim 11, wherein the data processing module has a multitasking operating system running in real time, and equipped with a graphical user interface.

13. The device according to claim 1 further comprising an RFID proximity reader and/or at least one element allowing reading of bar codes, especially a camera or a scanner.

14. The device according to claim 1, wherein the printer module is provided with an easy paper load system standard.

15. The device according to claim 1 further comprises an internal power source including a storage battery or a battery type.

16. Use of the portable electronic printing device according to claim 1 as part of a sale system.

* * * * *